May 7, 1935. A. E. OSWALD 2,000,571
BATTERY RECONDITIONING APPARATUS
Filed May 19, 1934
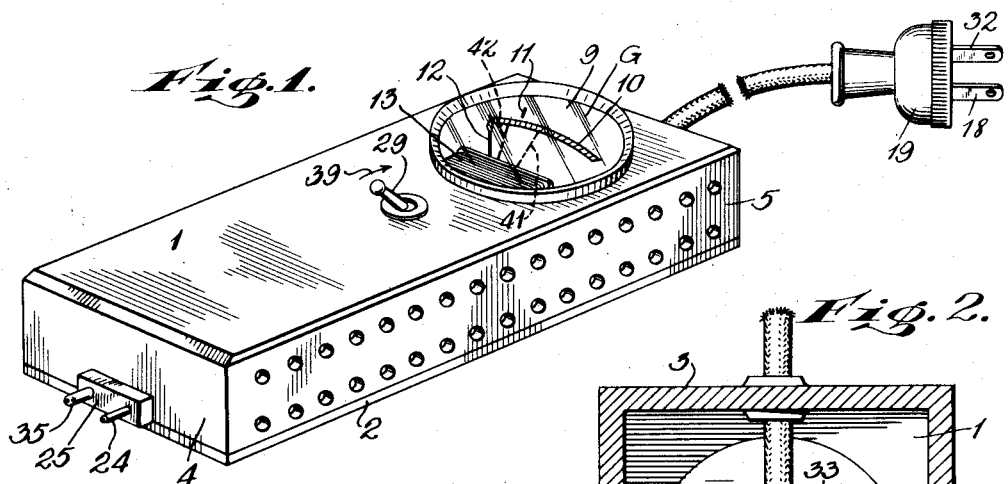
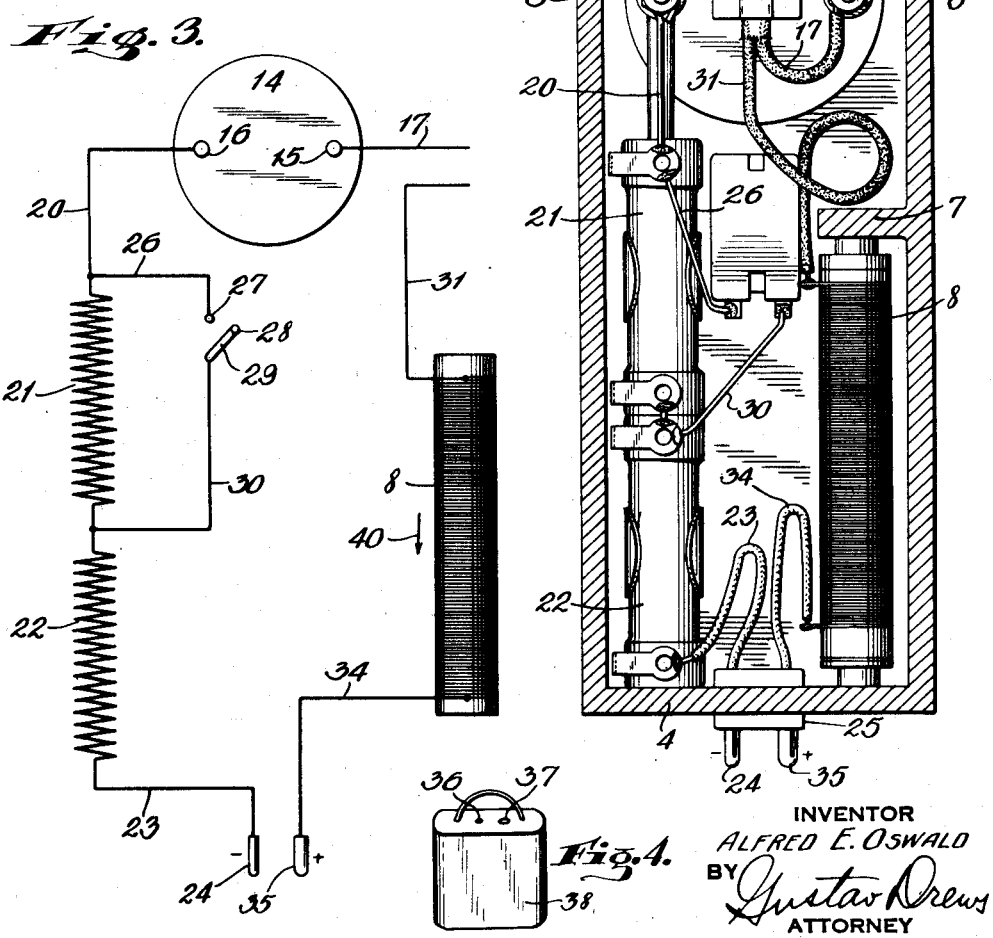
INVENTOR
ALFRED E. OSWALD
BY Gustav Drews
ATTORNEY Patented May 7, 1935

2,000,571

UNITED STATES PATENT OFFICE 2,000,571

BATTERY RECONDITIONING APPARATUS

Alfred E. Oswald, Hackensack, N. J., assignor to Bates Laboratories, Inc., New York, N. Y., a corporation of New York Application May 19, 1934, Serial No. 726,435

5 Claims. (Cl. 171—314)

The present invention is concerned with conditioning special batteries particularly of the type employed in connection with hearing aids and more particularly of the dry cell type adapted to be conveniently carried about the person. It is customary to utilize with present hearing aids relatively large and bulky dry cell batteries designed to have an operating power capacity of fifty hours. Manufacturers, however, advise that a battery according to these specifications be used for a period of eight hours or less at a time. Afterwards the battery is permitted to rest to overcome the internal fatigue thereof. If use of a battery were needed for periods greater than eight hours the user required as a part of his equipment at least one or more batteries always accessible. In other words, with at least two batteries available the maximum use obtained would be about one hundred hours. The batteries of the type having a capacity of fifty hours, however, are relatively large, bulky and heavy. Men wearing a hearing aid, in actual practice, attach the battery thereof to a belt carried about the waist line. If a hearing aid be worn by a woman the battery was concealed in her bosom or stockings, etc. Particularly with women it is apparent that the carrying about of a relatively heavy large size battery is an aggravating and chronic annoyance. It is thus a primary object of the invention to provide means for conditioning a special type of dry cell battery for hearing aids, the battery being of a relatively small size and small weight and of the dry cell type which may be readily concealed and manufactured at a relatively low cost and if employed in accordance with the present invention, by reason of conditioning, the life thereof can, as conclusively established by experiment and test, be extended or prolonged to have at least eight times its original life. Hence, if selective use is made of two small type batteries according to the invention in connection with a hearing aid at least sixteen times the original life and capacity of one battery can be had despite the fact that the size and the weight of each of the batteries employed has been materially reduced for the comfort and convenience of the user.

The invention has as another object the provision of means for selectively conditioning relatively small dry cell batteries particularly for hearing aids, the conditioning means being preferably of the portable type which may be conveniently and quickly placed in a desirable small location and which may be operated and controlled in fool-proof fashion by a user having practically no electrical training or background and without previous experience in manipulating or controlling electrical equipment. The invention has as another important object the provision of a portable relatively small and compact conditioning means for increasing the life of small dry cell batteries utilized particularly with hearing aids, the conditioning means being universal in action adapted to be actuated from either a controlled source of alternating or direct current.

The invention has for another object to provide conditioning means for small dry cell batteries specifically applicable for hearing aids, the conditioning means comprising predetermined electrical resistors so proportioned that when selectively utilized in connection with alternating or direct current substantially the same charge of average current will be passed into the battery operatively and disconnectively attached to the conditioning means.

Other objects, advantages and features of the invention are in part obvious and in part pointed out hereinafter.

The invention accordingly comprises the features of construction, combinations of elements, and arrangements of parts, which will be exemplified in the construction hereinafter described and more particularly pointed out in the appended claims.

For a clearer understanding of the nature and the objects of the invention reference should be had to the following detailed description taken in connection with the accompanying drawing in which, Fig. 1 is a perspective view of the conditioning device according to the invention, Fig. 2 is an enlarged transverse section of Fig. 1, illustrating several of the electrical elements within the casing of the conditioning device, Fig. 3 is a diagrammatic or schematic view of the system for conditioning a special type of dry cell battery adapted for use in connection with hearing aids, and lastly, Fig. 4 is a perspective view of a small type of dry cell battery of the type above alluded to, adapted to be conditioned by the system illustrated in Fig. 3.

The conditioning device consists essentially of a housing having an upper wall 1, a base 2, two end walls 3 and 4 and two side walls 5 and 6. The side wall 6 is equipped with an abutment 7 between which and the end wall 4, there is mounted the copper oxide rectifier 8 of standard construction.

The wall 1 is provided with an opening to accommodate the face 9 of a galvanometer G having an arcuate graduated marking 10 thereon. In alinement with a portion of said graduated marking 10 disposed at a predetermined location, the mark 11 is provided to indicate the position of the needle 12 of said galvanometer when in alinement with the same to show whether the conditioning device is properly functioning for either direct current or alternating current.

The needle 12 is operatively mounted in the usual way with relation to the galvanometer winding 13 mounted in the casing 14. The casing 14 has two terminals 15 and 16. The terminal 15 is connected to one main lead 17 of the source of supply connected to the prong 18 of the outlet plug 19. The terminal 16 is connected by the conductor 20 with the resistance 21, which resistance is in turn connected with the resistance 22, which resistance 22 is connected with the conductor 23 connected in turn to the narrow pin or terminal 24 which, see Figs. 1 and 2, is positioned to extend through the insulated block 25 mounted in the end wall 4.

The conductor 20 adjacent the resistance 21 is connected by the conductor 26 with the contact 27 to be engaged by the contact 28 of the switch arm 29, which switch arm 29 is connected by the conductor 30 with the connection intermediate the resistances 21 and 22. The rectifier 8 is connected to the other main lead 31 which is connected to the prong 32 of the outlet plug 19. The leads 17 and 31, see Fig. 2, are preferably secured to the back of the casing 14 by the bracket 33.

The other end of the rectifier 8 is preferably connected as indicated by the conductor 34 with the wide pin or terminal 35 also mounted in the insulated block 25.

The pins or terminals 24 and 35 are of different dimensions as indicated to fit the openings or sockets 36 and 37 respectively of the battery 38 so that the direction of the current through the battery 38 cannot be mistaken by the average layman.

The resistance 21 is predetermined to have a value of two thousand ohms, the resistance 22 a value of one thousand ohms and the rectifier 8, a resistance of five hundred ohms.

When the switch arm 29 is positioned as indicated in Fig. 1, it will clear the contact 27 in which case, the resistance 21 will be in circuit. On the other hand, when the switch arm 29 is moved in the direction of the arrow 39, its contact 28 will engage the contact 27 and cut out the resistance 21.

In use, let us assume the source of current to be direct current and the switch arm 29 to be positioned as indicated in Figs. 1 and 3, when the resistance 21 will be cut in. It will then only be necessary to connect the battery 38 to the pins 35 and 24 so that the small pin 24 is inserted into the small orifice 36 and the large pin 35 is inserted into the large orifice 37. The prongs 18 and 32 must then be so connected to the source that the current will come in through the prong 32 and pass through the rectifier 8 in the direction of the arrow 40. If the prongs 32 and 18 are so connected to the source of supply, the needle 12 will immediately jump up to the mark 11 and the charging properly started.

If, however, the prongs 18 and 32 were not properly connected, the needle 12 would drop to the left of the dotted line position 42 and immediately indicate to the user that the current is direct current, that the switch 28 is properly set but that the prongs 18 and 32 are connected to the wrong wires.

If, however, the prongs 18 and 32 are properly connected and the current supply is direct current and the switch arm 29 is in the wrong direction, that is so that its contact 28 engages the contact 27 to cut out the resistance 21, then the needle 12 will jump beyond the mark 11 approximately to the dotted line position 41 indicated in Fig. 1. The user will then immediately note that the switch arm is in the wrong direction and upon actuating it to cut in the resistance 21, the needle 12 will move over to aline with the mark 11.

On the other hand, if the current is alternating current, then the position of the prongs 18 and 32 is immaterial and attention need only be paid to the position of the switch arm 29. If it is disposed so that its contact 28 engages the contact 27 to cut out the rsistance 21, the needle 12 will move over to the mark 11 and charging will be properly commenced.

If, however, the arm 29 is in open position where it is desired to include resistance 21 then the needle 12 will not line up with the dotted line position 42 and the user will immediately note that the control switch arm is in the wrong position.

In the case of conditioning the small dry cell battery 38 by direct current, this battery is attached to the overhanging accessible terminals 24 and 35 of the casing. In this case the control or switch arm 29 is open. With the proper polarity determined, to wit, prongs 18 and 32 having been attached to the proper sockets associated with the source of electrical energy having a potential pressure of 110 volts, the circuit affected comprises conductor 31, rectifier 8, conductor 34, terminal 35, the positive pole or battery 38, the electrolyte of the battery, negative pole of the battery, terminal 24, conductor 23, the resistor means comprising complementary resistances 22 and 21, conductor 20, galvanometer or ammeter 14 and return conductor 17. Current accordingly passes into the battery 38 but in a direction counter to the direction of its internal electromotive force. Consequently, the dry cell battery 38 is now subjected to the step of conditioning. If the conditioning process is continued a period of time within which the battery is disassociated with the hearing aid, the life of the battery is increased or prolonged and its ampere and voltage output accordingly is raised, the power thereof being utilized for the proper operation and power medium required to operate a hearing aid for a sustained period of use. From experiments it has been determined that if a battery according to the present invention is left to condition for a period of time, to wit, of four hours, the conditioned battery may be used following the conditioning for a substantially corresponding period of time, to wit, four hours. By reason of the periodic conditioning of a small size relatively light battery with the conditioning system according to the invention and the discharging of the conditioned battery when connected to a hearing aid the capacity thereof has been extended substantially eight times the original life. This advantage is obtained by passing current through a previously discharged battery for a suitable time interval.

In the case of the utilization of alternating current, the circuit affected comprises prong 18, conductor 31, rectifier 8, conductor 34, terminal 35, the poles of the dry cell battery 30, terminal 24, conductor 23, resistors 22, conductor 30, switch arm 29, contact 27, conductor 26, conductor 20, galvanometer 14, conductor 17 and prong 32. In either case the circuit of the conditioning means whether alternating or direct current is employed, the current passing into the dry cell battery will be substantially the same or the same average or constant charge will be supplied by reason of the predetermined calculated control resistors or regulating means 21 and 22.

Hitherto, the idea prevailed that a dry cell battery could not be conditioned to increase its effective usable life. My experiments have disclosed however that in the case of small dry cell batteries of the type above alluded to that the old idea does not apply and by reason of conditioning of these batteries the life thereof has been increased as previously stated many fold. This is an important feature of the invention. While it may be true that the conditioning brought about may not correspond to recharging as in the case of a storage battery, nevertheless, a decidedly beneficial action occurs in the small type of batteries according to the invention by conditioning the same with a system of the present invention. This beneficial action takes place apart from depolarization of the cells.

It is obvious that various changes and modifications may be made to the details of construction without departing from the general spirit of the invention as set forth in the appended claims.

I claim:

1. In a system for conditioning relatively small light weight dry cell batteries of the type utilized in connection with hearing aids and of the type having terminal receiving sockets, the combination of, conditioning means having spaced accessible terminals removably and operatively receivable in said sockets, said conditioning means comprising a circuit having polarity indicating means, said circuit adapted to be selectively subjected to alternating or direct current, a pair of predetermined resistances in series disposed in said circuit upon the application of direct current to said circuit, control means for shunting one of said resistances to leave the remaining resistance of said pair in said circuit preparatory to the application of alternating current to said circuit, and a rectifier disposed in said circuit, said pair of resistances and the remaining resistance of said pair having a resistance value to control the flow of current into said battery for supplying the latter with substantially the same amount of current when said circuit is subjected to alternating or direct current.

2. In a system for conditioning relatively small light weight dry cell batteries of the type utilized in connection with hearing aids and of the type having terminal receiving sockets, the combination of, conditioning means having spaced terminals disconnectably receivable in said sockets, said conditioning means comprising a circuit including said terminals, a pair of resistors in said circuit having a predetermined resisting value, means for selectively controlling one of said resistors, and a rectifier in said circuit, said circuit adapted to be subjected to alternating or direct current, said control means being operable to include said pair of resistors in said circuit preparatory to the application of direct current to said rectifier, said control means being adapted to cut out one of said resistors preparatory to the application of alternating current to said circuit, said resistors being so proportioned to permit substantially the same average amount of current to flow into said battery when said circuit is subjected to alternating or direct current.

3. In a system for conditioning a relatively small and light weight dry cell battery for hearing aids, the combination of, a casing, conditioning means within said casing adapted to be subjected to direct or alternating current, said conditioning means comprising a circuit having a pair of predetermined resistors, rectifying means connected in said circuit, control means for cutting out one of said resistors preparatory to subjecting said rectifying means to alternating current, said control means being operable to restore said last mentioned resistor in said circuit preparatory to subjecting said conditioning means to direct current and spaced terminals carried by said casing and operatively associated with said circuit, said battery having spaced sockets adapted to removably receive said terminals, said pair of resistors when said circuit is subjected to direct current and said resistor disposed in said circuit upon the application of alternating current to said circuit being so proportioned as to control the supply of current passing into said battery for conditioning the latter with substantially the same average amount of direct current even though said conditioning means is selectively subjected to direct or alternating current.

4. In a system for conditioning relatively small dry cell batteries of the type utilized in connection with hearing aids and of the type having terminal receiving sockets, the combination of, conditioning means having spaced terminals disconnectably receivable in said sockets, said conditioning means comprising a circuit including said terminals, resistor means in said circuit, a rectifier in said circuit adapted to be subjected to alternating or direct current, and means for controlling the resisting value of said resistor means, said resistor means being fully disposed in said circuit upon the application of direct current to said rectifier to supply a predetermined amount of current to said battery, said controlling means adapted to cut out a portion of said resistor means leaving a remainder of said resistor means in said circuit preparatory to the application of alternating current to said circuit for controlling the supply of current to said battery to an amount corresponding substantially to said aforementioned amount at the time when said rectifier is subjected to alternating current.

5. In a system for conditioning a dry cell battery, the combination of, conditioning means comprising a circuit adapted to be electrically associated with said battery, resistor means in said circuit, a rectifier disposed in said circuit adapted to be subjected to alternating or direct current, and control means for cutting out a portion of said resistor means leaving a remainder thereof disposed in said circuit, said resistor means being disposed in said circuit upon the application of direct current to said circuit, said remainder being disposed in said circuit upon the application of alternating current to said circuit, said resistor means and remainder being so proportioned to permit substantially the same average amount of current to flow into said battery when said rectifier is subjected to either alternating or direct current.

ALFRED E. OSWALD.